United States Patent [19]

Seecamp

[11] 4,397,453
[45] Aug. 9, 1983

[54] SELF-TELESCOPING CARTRIDGE MAGAZINE SPRING

[76] Inventor: Lueder Seecamp, 487 Wolcott La., Orange, Conn. 06477

[21] Appl. No.: 354,896

[22] Filed: Mar. 4, 1982

Related U.S. Application Data

[63] Continuation-in-part of Ser. No. 153,312, May 27, 1980, abandoned.

[51] Int. Cl.³ ............................................... F16F 1/04
[52] U.S. Cl. ........................................ 267/180; 267/62
[58] Field of Search ......................... 42/6, 7, 49 R, 50; 267/60, 61 R, 62, 166, 180, 167

[56] References Cited

U.S. PATENT DOCUMENTS

| | | | |
|---|---|---|---|
| 274,715 | 3/1883 | Buckley | 267/61 R |
| 1,751,261 | 3/1930 | Wilson | 267/62 |
| 1,965,402 | 7/1934 | Adelmann | 267/180 |
| 2,586,646 | 2/1952 | Graham | 267/61 R |
| 4,107,862 | 8/1978 | Sofinowski | 42/50 |
| 4,111,407 | 9/1978 | Stager | 267/166 |

FOREIGN PATENT DOCUMENTS 527182  3/1954  Belgium .............................. 267/180

Primary Examiner—Duane A. Reger

[57] ABSTRACT

A self-telescoping cartridge magazine spring having two-sizes of coils with the smaller ones disposed at various points along the length of the spring, such that on compression they fit completely within the outer ones. The inner and outer coils are connected by straight sections within which the transition from one size to the other is made, so that they can bend laterally in order to conform to the space available without increasing the solid-height of the spring, while providing a substantially longer free-length, and therefore available compression, than that provided by magazine springs of prior designs.

6 Claims, 11 Drawing Figures

SELF-TELESCOPING CARTRIDGE MAGAZINE SPRING

This application is a continuation-in-part of my co-pending application Ser. No. 153,312 filed May 27, 1980, now abandoned.

BACKGROUND OF THE INVENTION

The present invention relates to coil springs for cartridge magazines, which are more or less oval shaped with each coil consisting of curved sections at the narrow ends and straight sections on the sides. Such springs are technically a combination cantilever-coil spring.

The free-length of a compression spring is the full length to which it extends when no force is applied to it along its longitudinal axis. On the other hand, the solid-height of such a spring is its length when it is fully compressed. Since the total amount that a given spring can be compressed is the difference between its free-length and its solid-height, it is apparent that available compression depends in large part on its solid-height, which in turn usually depends on the diameter of the wire and the number of coils used. As a practical matter the potential free-length, and therefore the available compression, of a conventional spring having a given solid-height is limited within narrowly defined ranges well recognized in the art.

In cartridge magazines for firearms which employ a spring to urge the cartridges into a dispensing position within the magazine, space limitations imposed primarily by the design of the firearm, make it highly desirable to provide a spring having a greater compression to solid-height ratio than is attainable with springs of conventional design, so that the usable space within the magazine is increased because of the smaller amount of space occupied by the spring at solid-height. Furthermore, other things being equal, a spring with a longer free-length will perform better than one having a shorter free-length. However, as hereinbefore mentioned, conventional spring designs preclude increasing potential compression or free-length because such springs are designed in each particular application to provide maximum free-length for a given solid-height. It necessarily follows, therefore, that the original magazine spring for a cartridge magazine usually can not be replaced by a conventional spring for the purpose of increasing the usable space and, therefore, the capacity of the magazine.

While telescoping springs known in the art can have a greater compression to solid-height ratio as compared to non-telescoping springs, up to now they have not been satisfactory for use in cartridge magazines. Telescoping springs usually consist of two or more separate springs, one disposed within the other and produce undesired variations in spring rates. Such a spring is not self-telescoping in the sense it is a single spring having coils of different sizes which fit one within the other. On the other hand, the type of spring commonly referred to as bed springs, such as those shown in the patent to Wilson U.S. Pat. No. 1,751,261, for example, are not suitable as magazine springs because they have a very high variable spring rate and do not conform to the shape of a cartridge magazine. The same is true of barrel springs and other types of springs which are formed by sequentially arranged conical sections, such as those shown in the patent to Buckley U.S. Pat. No. 274,715.

Cartridge magazine springs, unlike most other types of springs, are generally compressed to near their solid-height and are therefore subjected to greater internal stress than springs of comparable size which are usually not compressed to solid-height during use. However, the spring action of magazine springs is provided for the most part by the bending action in the straight sections of the spring rather than by the torsion produced in twisting the curved portions. Consequently, the internal stresses in magazine springs are not as great as in typical coil springs made up entirely of round helical coils, wherein the spring action is provided entirely by torsional stresses. In order to design a self-telescoping helical coil spring, it would be necessary to provide enough space between the inner and outer coils to permit the portions of the coil which join the inner and outer portions of the coil to bend laterally as well as to twist. Because such portions are round or otherwise curved, they would be subjected to considerable added stresses and would probably be permanently distorted out of shape if used as a spring for a cartridge magazine.

It is the object of the present invention to provide a cartridge magazine spring for firearms having increased free-length, and therefore available useful compression, as compared to prior magazine springs having the same solid-height. Stated another way, the object of the invention is to provide a magazine spring having a solid-height which is less than that of prior magazine springs designed for a particular firearm, when reduction in the space occupied by the spring at solid-height can mean extra rounds in the magazine.

SUMMARY OF THE INVENTION

In order to obtain increased compression without an increase in solid-height, I have devised a unique self-telescoping cartridge magazine spring which combines straight sections with curved portions as in typical cantilever-coil springs. However, in accordance with my invention two sizes of coils are arranged with the smaller ones disposed at various points along the length of the spring in such a way that they can telescope completely within the larger-size coils. Complete telescoping is accomplished by making the transition from one size coil to the other take place entirely within the straight sections that joins them, rather than within the curved portions. Furthermore, in order to achieve maximum extension and minimum solid-height, the straight sections in which these size-transitions are made must be distributed substantially equally on opposite sides of the spring.

It should be noted that the curved portions of the spring may be either continuously curved through substantially 180° of arc or they may be short curves of less than 180° joined by short straight sections of wire, the sum of the angles subtending such short curves equaling substantially 180°.

DETAILED DESCRIPTION OF PREFERRED EMBODIMENTS OF THE INVENTION

Reference is made to the accompanying drawings, wherein

The dimensions of the springs shown in the accompanying drawings have been exaggerated for illustrative purposes. In practice the spacing between the inner and outer coils as they telescope is desirably considerably less than that shown in order to obtain lateral stability of the coils and less variation in the spring rate between the inner and outer columns of coils, as well as greater free-length. As will become more apparent hereinafter, the ability to reduce the space between the telescoping coils is a distinct advantage of the present invention over self-telescoping springs in which the transition from one size coil to another is made within the curved portions of the coil, thereby necessitating considerably greater space between the inner and outer coils in order to permit the coils to telescope. Springs embodying the present invention only require enough spacing for lateral clearance between the coils.

DETAILED DESCRIPTION OF THE EMBODIMENT OF FIGS. 1-7

Figure 1:
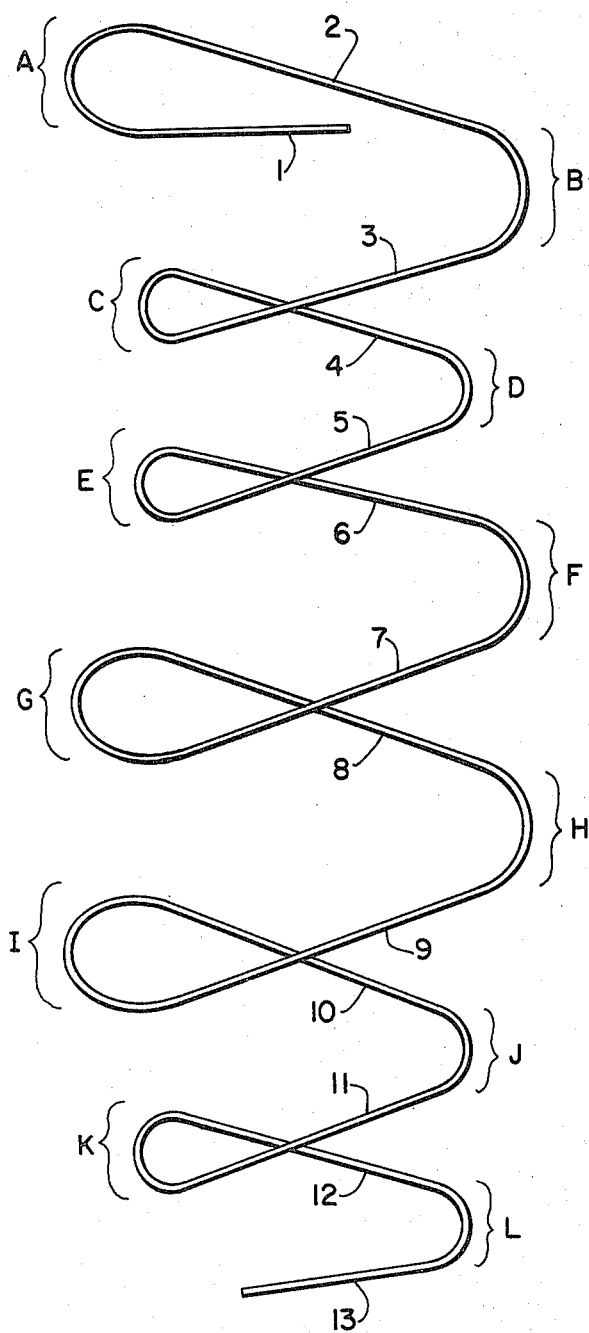
FIG. 1 is a diagrammatic view in perspective of a self-telescoping cartridge magazine embodying the present invention.
Figure 2:
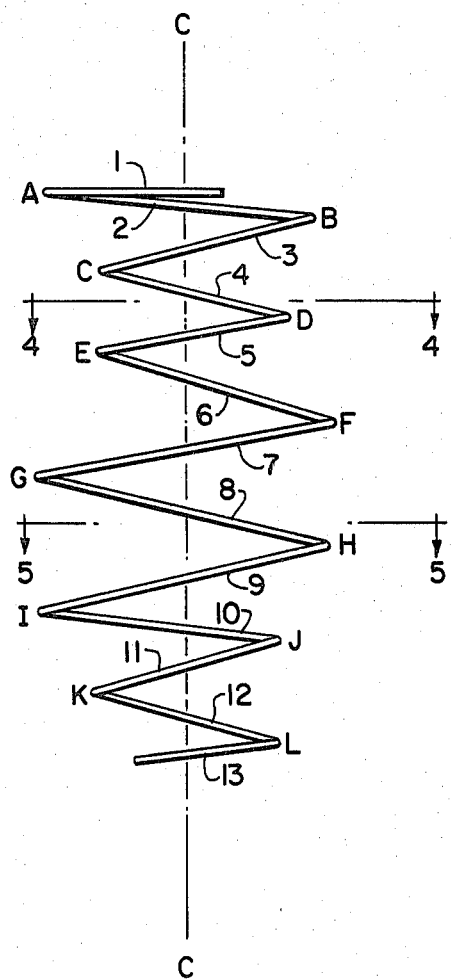
FIG. 2 is a side elevation of the spring shown in FIG. 1 but on a smaller scale.
Figure 3:
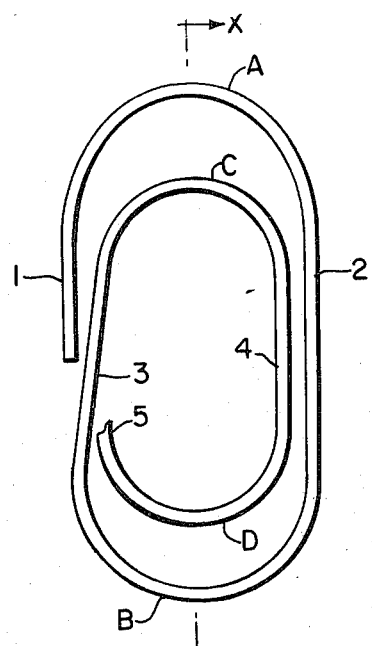
FIG. 3 is an enlarged top plan view of the upper two coils of the spring shown in FIGS. 1 and 2.
Figure 4:
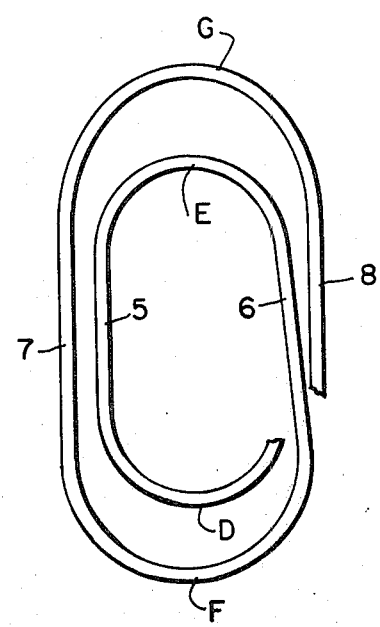
FIG. 4 is an enlarged cross-sectional view of the spring shown in FIGS. 1 and 2 taken on the line 4—4 of FIG. 2, showing the coils in a central section of the spring.
Figure 5:
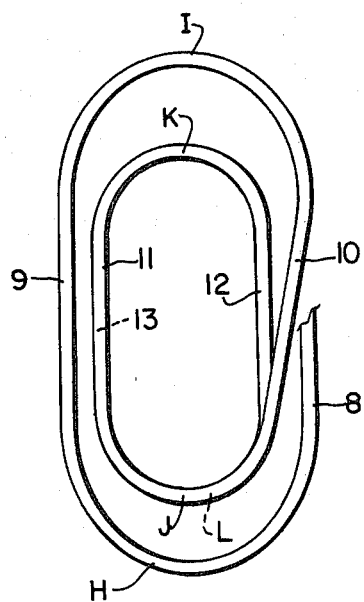
FIG. 5 is an enlarged cross-sectional view taken on the line 5—5 of FIG. 2, showing the bottom coils.

The spring shown in FIGS. 1-7 consists of twelve curved portions of wire designated by the letters A through L, each subtending an angle of 180°. Curved portions A, B, F, G, H and I have a larger radius than portions C, D, E, J, K and L. In addition, there are thirteen straight sections of wire designated by the numerals 1 through 13 which are disposed between the curved portions such that the spring is made up of alternating straight and curved portions. Except for end sections 1 and 13, straight sections 1-13 are of three basic kinds. The long sections 2, 7, 8 and 9 each, join the larger or outer curved portions adjacent to them in the sequence in which they occur. Thus, section 2 joins curves A and B; section 7 joins curves F and G; section 8 joins curves G and H; and section 9 joins curves H and I. Similarly, the shortest sections 4, 5, 11 and 12 each join the small or inner curved portions C, D, E, J, K and L, while the sections 3, 6 and 10 of intermediate length each join an outer curved portion and an inner curved portion. Thus, as shown in FIG. 3, section 3 joins the outer curved portion B with the inner curved portion C, thereby forming a transition from the outer coil, which includes the large curved portions A and B, to the inner coils, which includes the smaller curved portions C and D. Similarly, section 6 (FIG. 4) joins the inner curved portion E and the outer curved portion F, thereby completing the transition from the inner column of smaller coils to the outer coils. In this particular spring, a third transition is made as shown in FIG. 5 in which the transition section 10 joins the large curved portion I and small curved portion J.

It should be noted that all the straight sections, with the exception of the medium length transition sections, are disposed substantially parallel to a central plane X—X (FIG. 3), about which the coils are laterally oriented, and that all the curved portions are disposed symmetrically about the central longitudinal axis C—C (FIG. 2) of the spring. Furthermore, on each side of the spring the number of large curved portions matches the number of small curved portions with the same number of each size curve on one side as on the other.

Figure 6:
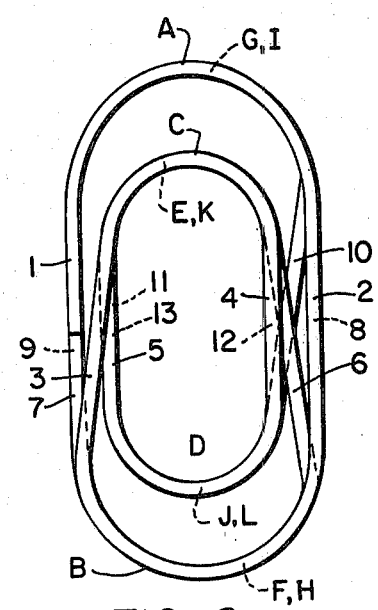
FIG. 6 is a top plan view of the spring showing a composite of FIGS. 3, 4 and 5.
Figure 7:
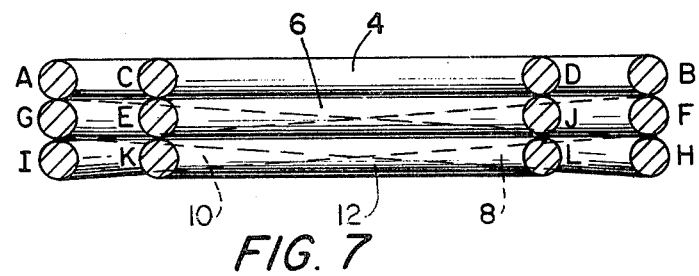
FIG. 7 is a longitudinal section through the spring of FIGS. 1 through 6, taken along the central plane X—X shown in FIG. 3 and looking in the direction of the arrows, the spring being shown compressed to solid-height.
Figure 8:
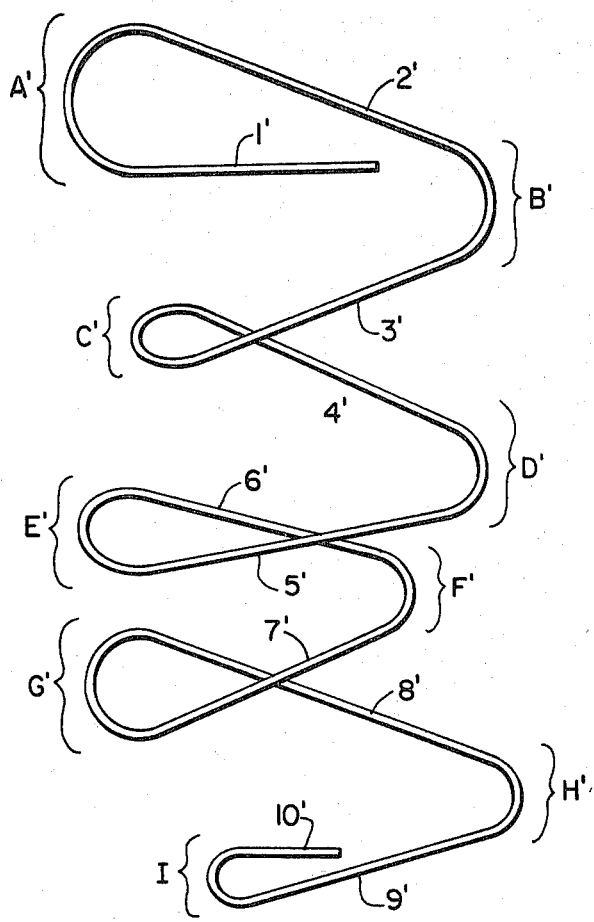
FIG. 8 is a diagrammatic view in perspective of a self-telescoping spring of another embodiment of the invention.

When the spring is compressed as shown in FIG. 7, the curved portions of small radius are positioned within the curved portions of larger radius and thus to not add to the solid-height of the spring. Furthermore, as is best seen in FIGS. 3-6, the short straight sections are situated inward of the longer straight sections so that they likewise do not add to the solid-height of the spring. As for the transition sections 3 and 6 which occur within any two consecutive coils of the spring, it will be noted by comparing FIGS. 3 and 4 that the transition (section 3) between the large curve B and the small curve C is on one side of the spring, whereas the transition (section 6) from the small curve E to the large curve D is on the other side of the spring, thereby avoiding a cross-over of the two transition sections which would increase the solid-height of the inner-coil segment of the spring beyond that already established by the curved portions.

However, where the cross-over of any two transition sections takes place at least two coils apart, the space between them lengthwise of the spring is sufficient to avoid the cross-over from adding to the solid-height of the spring. Thus, as will be seen in FIGS. 2 and 5, the transition section 10 from the large curved portion I to the small curved portion J is on the same side of the spring as the immediately prior transition section 6, so that sections 6 and 10 cross each other as illustrated in FIG. 6. Such cross-over, however, does not add to the solid-height of the spring because there is sufficient room lengthwise of the spring for both sections 6 and 10 to nestle within the outer coils on this side of the spring. On the other hand, if instead of the transition taking place within the straight section 10, it had been desired to make it within the section 9, this too would have been possible without increasing the solid-height because the transition would have been made on the opposite side of the spring from the immediately prior transition section 6, and also because it would be spaced at least two coils from the other transition section 3 on the same side of the spring.

When the spring shown in FIGS. 1-7 is compressed to solid-height, portions A and G are pressed against each other so that A rests on top of G, giving a solid-height of two wire diameters. The smaller portions C and E telescope within portions A and G, and are pressed against each other to give a solid-height of two wire diameters. Situated opposite A and G are curve portions B and F. These portions likewise provide a solid-height of two wire diameters when compressed, yet neither adds to the overall solid-height of the spring beyond the solid-height already established by portions A and G. Portion D is located laterally inward of B on compression and likewise does not add to the solid-height established by portions A and G of the outside column of coils. In addition, straight sections 1 and 7 are connected against each other without adding to the total solid-height, as do sections 2 and 8 on the opposite side of the spring. The transition section 3 is compressed lengthwise of the spring against the short straight section 5 to a solid-height which is again two wire diameters. On the opposite side of the inner coils, section 4 and transition section 6 are similarly compressed to a solid-height of two diameters. Consequently, all the coils in the top two segments of the spring, starting with the straight end 1 to the straight section 8, have a solid-height of two wire diameters.

As seen in FIGS. 5 and 7, when the bottom coils of the spring containing curves H and L are compressed to solid-height, the large curves H and I are engaged by curves F and G, respectively, making the total solid-height of the spring three wire diameters. Thus, as shown in FIG. 7, the curved portions C, E and K on one side of the spring telescope completely within, and immediately adjacent, the large curved portions A, G and I, respectively, while on the other side of the spring, curved portions D, J and L are telescoped within, and adjacent, portions B, F and H, respectively.

It is also apparent from FIG. 7 that there is very little space within the three-wire height of the spring for both the smaller curved portions and the straight sections without increasing the solid-height of the spring. However, because the transition in coil size is made entirely within straight sections of wire, which are relatively bendable laterally as compared to the inherently more rigid curved portions, the straight sections conform to the space available within the confines of the outer coils of the spring. Thus, even though there are as many small curved portions on each side of the spring as large ones, the straight transition sections will fit within the outer coils without increasing the solid-height, as long as they are distributed on opposite sides of the spring. Furthermore, making the size transitions only within straight sections permits the inner coils to be as large as possible so long as they clear the outer coils. It also permits a design in which the transition from one size coil to the other and back can be made frequently along the length of the spring. Neither close lateral spacing nor frequent size transition in both directions is possible with springs in which the coils are continuously curved, where the transitions must occur within a curved portion of wire.

The complete spring illustrated in FIGS. 1–7 contains six full coils (three outer and three inner) which compress to a solid-height of only three wire diameters. On the other hand, in a spring of conventional design having six coils and made from wire of equal diameter, but in which the curved portions are uniform in size and the straight sections equal in length, the spring will compress to six wire diameters at solid-height. Springs embodying my invention are accordingly capable of compressing to a solid-height of one-half that of conventional, non-telescoping, magazine springs.

DETAILED DESCRIPTION OF THE EMBODIMENT OF FIGS. 8–11

Turning now to an alternative arrangement embodying the broad concept of the invention, FIGS. 8 through 11 again show a predominantly cantilever spring of straight and curved portions. The curved portions are of two basic sizes as in the spring of FIGS. 1 through 7, but in this case the straight sections (other than the end sections) are of only two basic lengths. Curved portions A', B', D', E', G' and H' are large, while curved portions C', F' and I' are small. The longer straight sections 2', 5' and 8' each connect two of the larger curved portions, while each of the shorter straight sections 3', 4', 6', 7' and 9' connect one of the smaller curved portions with an adjacent larger curved portion and provide transition from one size curved portion to the other. End section 1' is shorter than the longer of the sections, and section 10' is shorter than the short section.

Figure 9:
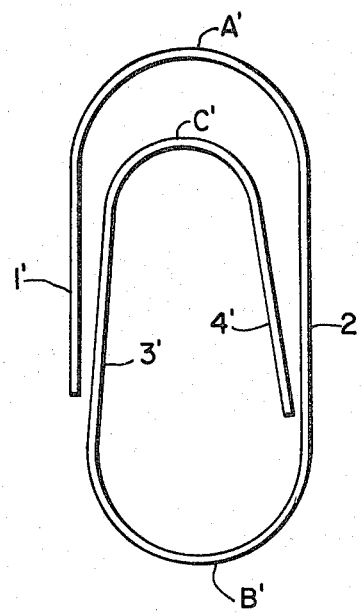
FIG. 9 is a diagrammatic view of the top segment of the spring shown in FIG. 8.
Figure 10:
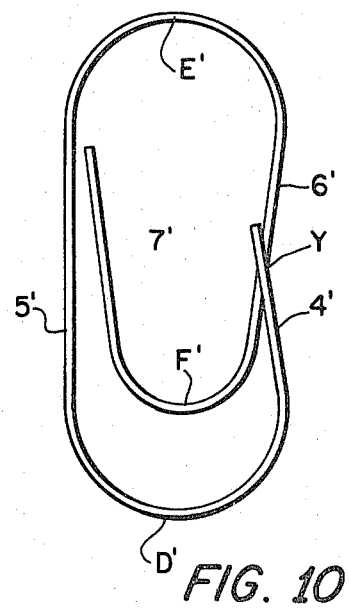
FIG. 10 is a diagrammatic view of the segment of the spring of FIG. 8 immediately below, and continuous with, the segment shown in FIG. 9.
Figure 11:
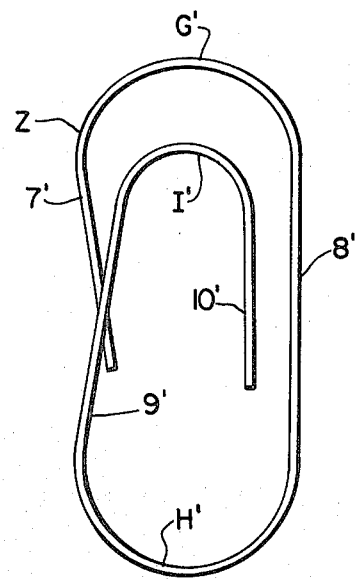
FIG. 11 is a diagrammatic view of the bottom segment of the spring of FIG. 8 and continuous with the segment of the spring shown in FIG. 10.

The top segment of the spring shown in FIG. 9, which represents more than one and a half coils, compresses to one wire diameter at solid-height. Sections 3' and 4' are transition sections between the two sizes of coils. At the point where transition section 4' joins the large coil, a solid-height of two wire diameters is reached, with large curved portion D' pressing against large curved portion B' to give a solid-height of two wire diameters. Long straight section 5' compresses against end section 1' and large curved portion E' compresses against large curve A', both giving a compressed solid-height of two wire diameters. Transition section 6' crosses over transition section 4' at Y without increasing the solid-height, which remains at two wire diameters until transition section 7' joins large curve G' at Z (FIG. 11), where a solid-height of three wire sizes is formed. Curves G', E' and A', thus compress to a solid-height of three wire diameters, as do curves H', D' and B'. Transition section 9' crosses section 7' and end section 10' crosses section 6', all within the large curved portions A', E', G' and B', D', H', without increasing the solid-height. The complete spring of FIGS. 8–11 thus has a solid-height of three wire diameters.

In comparison, a conventional magazine spring having the same number of curved portions and straight sections, but of uniform dimensions would have a solid-height of five wire diameters, as opposed to a solid-height of only three wire diameters when formed to telescope in accordance with the present invention.

From the foregoing, it is apparent that by using the present invention in cartridge magazines, the space that would be wasted by conventional magazine springs may be reduced so that added rounds may be stored in the magazine. Substantial benefits in reducing the solid-height of a spring without reducing its ability to perform the desired function are thus achieved.

What is claimed is:

1. A self-telescoping cartridge magazine spring comprising a plurality of alternating curved portions and straight sections disposed about the longitudinal axis of said spring,
   said curved portions being of two different sizes with the smaller disposed axially inward of the larger and occurring at various intervals lengthwise of said spring,
   each transition from one size curved portion to the other occurring entirely within one of said straight sections.

2. A magazine spring as defined in claim 1, wherein a plurality of said large curved portions occur in sequence to form a series of consecutive large coils lengthwise of said spring joined at least at one end to a said small curved portion by a said straight transition section.

3. A magazine spring as defined in claim 2, wherein a plurality of said small curves occur in sequence to form a series of consecutive small coils joined at least at one end to a said large curved portion by a said straight transition section.

4. A magazine spring as defined in claim 3, wherein said straight transition sections are disposed substantially evenly on opposite sides of the longitudinal axis of the spring.

5. A magazine spring as defined in claim 4, wherein said curved and straight sections are arranged such that when the transitions from one size curved portion to the other and back occur within two consecutive coils of the spring, the straight transition sections making such transitions are disposed on opposite sides of the longitudinal axis of the spring.

6. A magazine spring as defined in claim 5, in which there are more of said large curved portions than small curved portions.

* * * * *